United States Patent [19]

Royball

[11] Patent Number: 4,913,608

[45] Date of Patent: Apr. 3, 1990

[54] STRAP TIGHTENING DEVICE

[76] Inventor: Kenneth O. Royball, 1170 McKinley St., Redwood City, Calif. 94061

[21] Appl. No.: 320,211

[22] Filed: Mar. 6, 1989

[51] Int. Cl.⁴ ............................................. A63B 61/04
[52] U.S. Cl. ..................................... 410/103; 410/37; 410/50; 410/100; 74/577 R; 254/218
[58] Field of Search .................. 410/100, 37, 50, 103, 410/97, 98, 120, 103, 101, 102; 74/517 R, 517 S; 100/32; 254/218, 266

[56] References Cited

U.S. PATENT DOCUMENTS

| Re. 30,307 | 6/1980 | Arbogast | 410/37 |
|---|---|---|---|
| 1,544,097 | 6/1925 | McChesney | 254/218 |
| 3,290,010 | 12/1966 | Holmes | 410/97 |
| 4,045,002 | 8/1977 | Miller | 410/103 |
| 4,235,420 | 11/1980 | Ross et al. | 254/266 |
| 4,382,736 | 5/1983 | Thomas | 410/104 |
| 4,622,721 | 11/1986 | Smetz et al. | 254/218 |
| 4,673,144 | 6/1987 | Byford | 74/577 S |

FOREIGN PATENT DOCUMENTS 0246210  11/1987  European Pat. Off. ............ 410/100

Primary Examiner—Andres Kashnikow
Assistant Examiner—Christopher G. Trainor
Attorney, Agent, or Firm—Flehr, Hohbach, Test, Albritton & Herbert

[57] ABSTRACT

A strap tightening device for cinching an elongated strap to firmly hold cargo in place on a carrier is provided. The strap tightening device includes a frame having a drum rotationally mounted thereto. The drum has a longitudinal axis of rotation and three longitudinally extending slots for receiving the strap. A locking means is provided for selectively preventing the drum from rotating in at least one direction. To utilize the device for tightening straps, the elongated strap is threaded into the drum through a first one of the slots, out of the drum through a second one of the slots, back into the drum through a third one of the slots to form a loop (between the second and third slots), and back out of the drum through the first slot. Cranking means are provided to facilitate rotating the drum about its longitudinal axis to wind the strap about the drum.

12 Claims, 3 Drawing Sheets

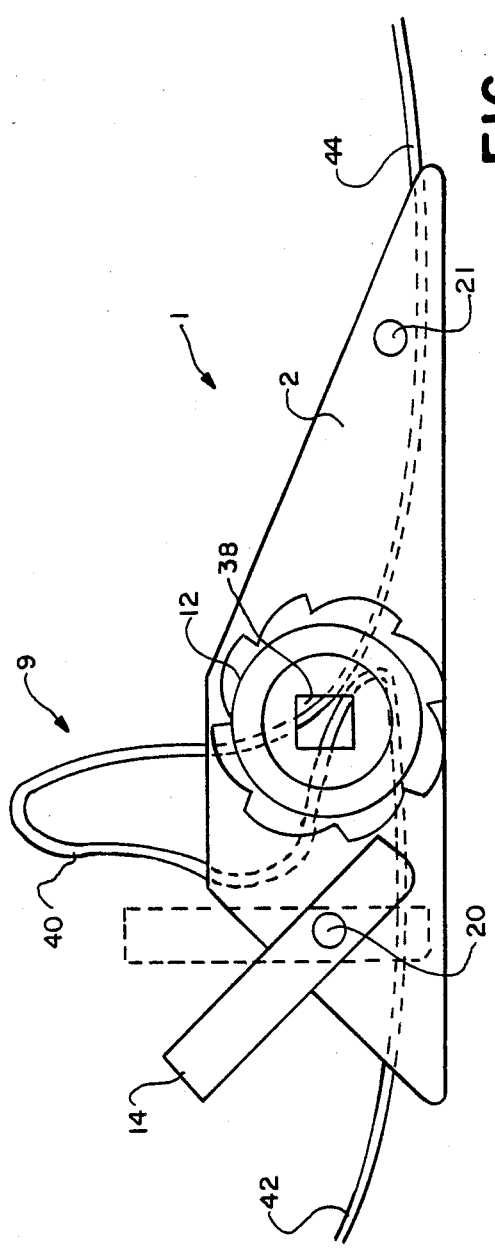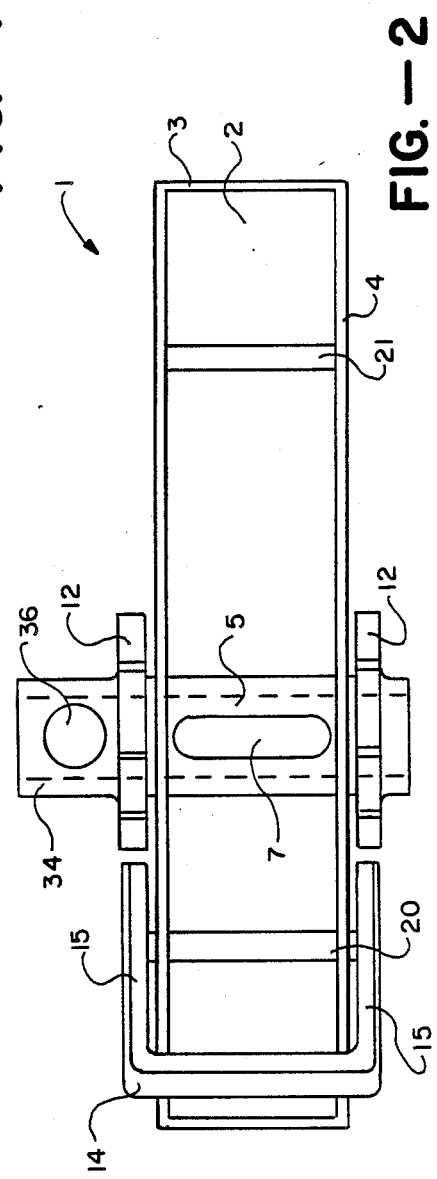

1

STRAP TIGHTENING DEVICE

BACKGROUND OF THE INVENTION

The present invention relates generally to a belt tightening device for securing loads to truck beds and the like. More particularly a novel free standing strap fastening device is disclosed which allows a belt to be tightened without moving the device.

A wide of strap fastening devices have been devised for tightening cargo straps to firmly secure cargo to truck and trailer beds during transportation. For example, U.S. Pat. Nos. 3,428,331; 3,697,048; 3,848,889; 4,045,002; and 4,382,736 all disclosure load fasteners adapted to tightly hold cargo to various trailer vehicles. Such load fasteners or cargo winches are typically fixably mounted to a truck trailer and the straps they secure are extended over the cargo and hooked to a loop or another fastener on the opposite side of the truck. The load fasteners are then cinched down to securely hold the bulk cargo on the trailer.

Other load fasteners are free standing. In one such device, a rotatable drum is carried by a frame. A lever arm, also rotatably coupled to the frame carries a pair of pawl arrangements which couple with an associated pair of ratchets carried on opposite sides of the drum. The drum includes a single longitudinal slot that is adapted to receive the strap to be tightened. The strap is threaded through the longitudinal slot. To tighten the strap, an operator moves the lever arm back and forth thereby rotating the drum with respect to the frame, which causes the strap to wrap thereabout. One drawback of such free standing devices is that they will move relative to the load while slack is being taken up. Such movement is undesirable since it can damage the cargo.

SUMMARY OF THE INVENTION

Accordingly, it is a general objective of the present invention of provide a novel strap fastening device that may be used to hold cargo in place.

Another object of the invention is to provide a free standing strap fastening device that does not creep while slack is being taken up.

To achieve the foregoing and other objects and in accordance with the purpose of the present invention, a strap tightening device is provided for tightening an elongated strap that is secured to a carrier on its opposite ends. The strap tightening device includes a frame having a drum rotationally mounted thereto. The drum has a longitudinal axis of rotation and three longitudinally extending slots for receiving the strap. A locking means is provided for selectively preventing the drum from rotating in at least one direction. To utilize the device for tightening straps, the elongated strap is threaded into the drum through a first one of the slots, out of the drum through a second one of the slots, back into the drum through a third one of the slots to form a loop (between the second and third slots), and back out of the drum through the first slot. Cranking means are provided to facilitate rotating the drum about its longitudinal axis to wind the strap about the drum.

Preferably, the frame includes a base and a pair of raised shoulders that extend outwardly from the base to rotatably support the drum. The locking means includes a pawl and rachet arrangement wherein the rachet is carried to the drum and the pawl is coupled to the frame.

In a method aspect of using the invention, the two free end of the elongated strap are secured to a trailer or the like. The drum is positioned such that slack may be freely taken up from both either free end by pulling on the loop. The strap fastening device may be positioned where desired, and slack taken up from a first one of the free ends by pulling on the loop portion of the strap. The drum is then rotated into a first locked position, wherein the first free strap end is firmly held in place while the second free strap end may still freely move through the drum. Slack is then taken from the second free strap end, again by pulling on the loop. Once the loose slack has been taken up from the strap, the drum is rotated into a second locked position wherein both the first and the second free ends are firmly held in place. The drum may then be further rotated to cinch the cargo strap across the load.

BRIEF DESCRIPTION OF THE DRAWINGS

The features of the present invention that are believed to be novel are set forth with particularity in the appended claims. The invention, together with further objects and advantages thereof, may be understood by reference to the following description when taken in conjunction with the accompanying drawings in which:

FIG. 1 is a diagrammatic side view of a strap tightening device built in accordance with the present invention.

FIG. 2 is a diagrammatic top view of the strap tightening device shown in FIG. 1.

DETAILED DESCRIPTION OF A PREFERRED EMBODIMENT

Figure 4:
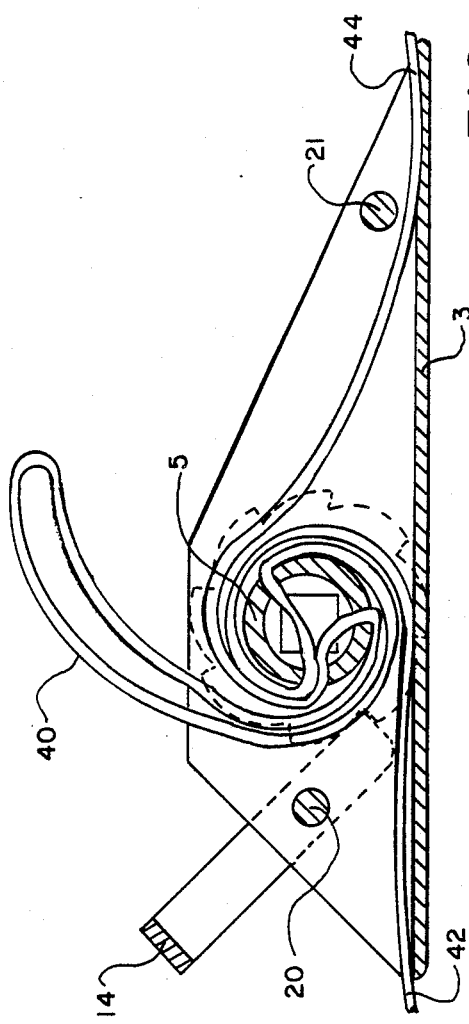
FIG. 4 is a cross sectional side view of the strap tightening device shown in FIG. 1 with the drum positioned to tighten the first end of the strap.

As illustrated in the drawings, an embodiment of the strap tightening device 1 of the present invention includes a frame 2, having a base 3 and a pair of spaced apart outwardly extending shoulder 4. A rotatable drum 5 is carried between the spaced apart frame shoulders 4. The drum 5 has a longitudinal axis of rotation and includes three longitudinally extending slots 7 for receiving an elongated strap 9. Locking means is provided for selectively preventing the drum from rotating in at least one direction. In the embodiment chosen for the purposes of illustration, as seen in FIGS. 1 and 2, the locking means includes a pair of rachet wheels 12 carried by the drum 5 and a two armed U-shaped pawl 14 mounted to frame 2.

Cranking means is provided to facilitate rotating the drum about its longitudinal axis to wind the strap about the drum. The cranking means includes coupling means carried by the drum for receiving a tool (not shown) suitable for rotating the drum. A pair of guide bars 20, 21 mounted between frame shoulders 4 are provided on opposite sides of the drum to guide the strap 9 in order to keep its loose ends free from interference with the drum's rotation. Guide bar 20 may also serve as a pivot axle for U-shaped pawl 14.

Figure 5:
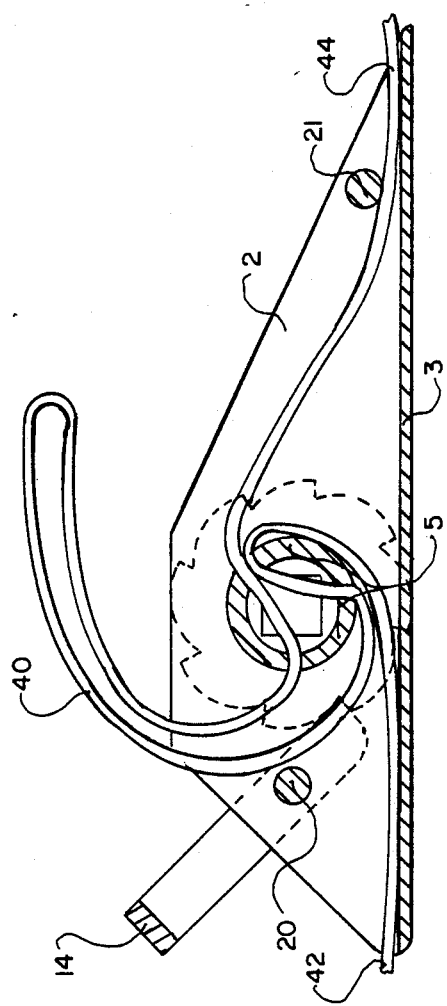
FIG. 5 is a cross sectional side view of the strap tightening device shown in FIG. 4 with the drum positioned to tighten the second end of the strap.
Figure 3:
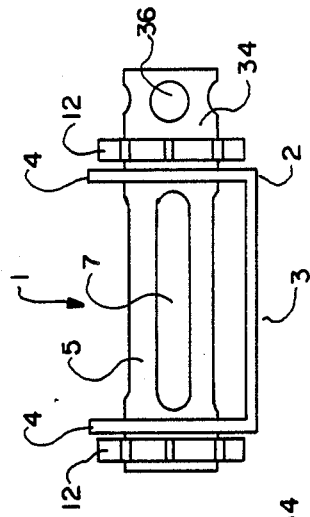
FIG. 3 is a diagrammatic end view of the strap tightening device shown in FIG. 1.
Figure 6:
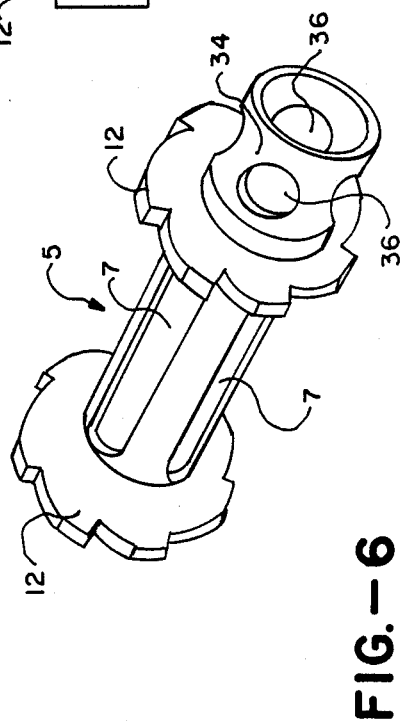
FIG. 6 is a perspective view of a drum.

Referring next to FIGS. 1, 4 and 5, longitudinal slots 7 in drum 5 are interconnected so that the strap 9 may freely pass into one of the slots and out through either of the other two slots. As can best be seen in FIG. 6, the drum 5 carries a pair of ratchets wheels 12 and includes an extension 34 having a plurality of borehole openings 36 for receiving a bar (not shown) to facilitate rotating the drum. The opposite end of the drum includes a box shaped opening 38 suitable for receiving a box wrench, again to facilitate rotating the drum. Thus, extension 34, borehole openings 36 and box shaped opening 38 cooperate to form the cranking and coupling means.

To utilize the strap fastening device, the elongated strap 9 is threaded into the drum through a first one of the slots, out of the drum through a second one of the slots, back into the drum through a third one of the slots to form a loop 40 (between the second and third slots), and back out of the drum through the first slot. The strap then includes the loop portion 40, a first free end 42 and a second free end 44. To keep loose ends of the strap from interfering with rotation of the drum, the free ends 42 and 44 of elongated strap 9 are preferably threaded under guide pins 20 and 21 respectively.

Figure 7:
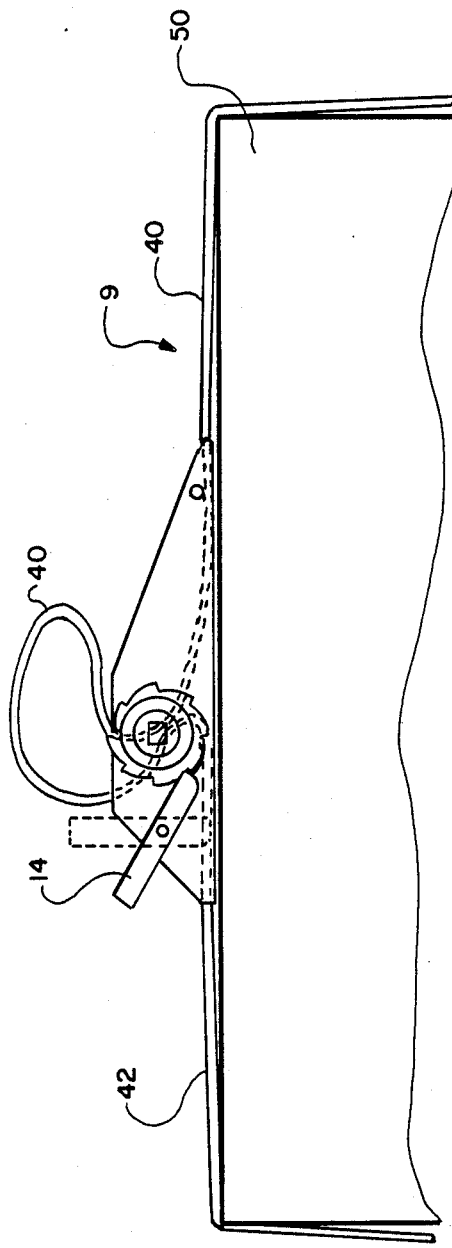
FIG. 7 is a side view of the strap tightening device shown in FIG. 1 holding cargo in place.

Referring next to FIG. 7, the strap fastening device may be used to secure cargo 50 to a wide variety of devices. For the purposes of illustration, the strap fastener is used to secure cargo to the bed of a truck. After the elongated strap has been threaded into the drum, the strap is placed over a load. Hook (not shown) on opposite ends of the strap are then attached to the truck bed. The drum and strap are initially arranged in substantially the manner seen in FIG. 7 wherein the slack within either free end of the strap 9 can be taken up merely by pulling on the loop 40. The strap fastening device is placed where desired and slack is taken up from at least the first free end 42 of strap 9. It should be appreciated that if desired, a substantial portion of the slack from the second free end may be taken up at the same time as well.

Once the slack from the first end has been taken up by hand, the drum is rotated to a first locked arrangement which is substantially the position shown in FIG. 4. Using the orientation shown in FIGS. 4 and 5 as a reference, the drum would be rotated in the counterclockwise direction to reach the first locked position. The initial rotations can be done by hand or with the assistance of a tool such as a box wrench or a bar. Pawl 14 is moved such that its arms 15 engage rachet wheels 12 to hold the drum in the first locked position by preventing the drum from rotating in the clockwise direction. It should be appreciated that the tension supplied by the first free strap end will prevent the drum from further rotating in the counterclockwise direction by itself.

In the first locked position, the first free end 42 of strap 9 is effective locked into place by friction. Thus, so long as the first free end is hooked into place, the strap tightening device 1 will not move appreciably relative to the load. Once the drum is set in its first locked position, the loop is once again pulled on to take up slack from the second free end 44. Again referring to the orientation given in FIGS. 4 and 5, once the slack within the second free end 44 has been taken up by hand, the drum is further rotated in a counterclockwise direction from the first locked position shown in FIGS. 4 to a second locked position as shown in FIG. 5. In the second locked position, both the first and the second free ends 42, 44 are locked into position about the drum 5 by friction. An appropriate tool in the form of a box wrench or a rod may then be used to further rotate the drum in a counterclockwise direction to wrap the strap about the drum in order to cinch the strap 9 down over the cargo. The drum 5 is rotated until the strap is well cinched down to firmly hold the cargo in place.

Although only one embodiment of the invention has been described in detail herein, it should be appreciate that the present invention may be embodied in many other specific forms without departing from the spirit or scope of the invention. Particularly, it should be appreciated that the drum threading technique is an important aspect of the invention and that many of the other components of the invention may be varied to a large degree. For example, locking means may take a wide variety of forms beyond the symmetric pawl and rachet mechanism described herein. Further, the shape of the frame may be widely varied, Similarly, the cranking means may be varied extensively within the scope of the invention.

It should also be appreciated that the strap fastening device disclosed may be used to secure loads to a wide variety of carriers including trailers, trollies, cars etc.. Therefore, the present examples and embodiments are to be considered as illustrative and not restrictive, and the invention is not to be limited to the details given herein, but may be modified within the scope of the appended claims.

What is claimed is:

1. A strap tightening device for tightening an elongated strap that is secured on its opposite ends, the strap tightening device comprising:
   a frame;
   a drum rotatably mounted to the frame, the drum having a longitudinal axis of rotation of three longitudinally extending slots for receiving said strap, said slots being interconnected to facilitate passing the strap into the drum through a first one of the slots and out of the drum through a second one of the slots; and
   locking means for selectively preventing the drum from rotating in at least one direction,
   whereby to utilize the device for tightening straps, the elongated strap is threaded into the drum through a first one of the slots, out the drum through a second one of the slots, back into the drum through a third one of the slots to form a loop between said second and third slots, and back out of the drum through the first slot.

2. A strap tightening device as recited in claim 1 further comprising cranking means for rotating the drum about its longitudinal axis to wind the strap about the drum.

3. A strap tightening device as recited in claim 2 wherein said frame includes a base and a pair of raised shoulders that extend outwardly from the base, each said shoulder having an interior surface and an exterior surface, and wherein said drum is rotatably carried by said shoulders such that said slots are disposed between said shoulders.

4. A strap tightening device as recited in claim 3 wherein said locking means includes a pawl and rachet arrangement, said rachet being carried by the drum.

5. A strap tightening device as recited in claim 4 wherein said locking means includes a pair of rachet wheels carried by opposite ends of the drum adjacent the exterior surfaces of the opposite shoulders.

6. A strap tightening device as recited in claim 5 wherein said pawl takes the form of a U-shaped member having two leg members pivotally coupled to the frame, wherein each said pawl leg member cooperates with one of said rachet wheels to selectively prevent the drum from rotating in one direction.

7. A strap tightening device as recited in claim 6 wherein said cranking means includes a shaft carried by the drum on the exterior side of one of said shoulders, the shaft including a box shaped opening for receiving a box wrench to facilitate rotating the drum.

8. A strap tightening device as recited in claim 6 wherein said cranking means includes a shaft carried by the drum on the exterior side of one of said shoulders, the shaft including an opening for receiving a bar to facilitate rotating the drum.

9. A strap tightening device for tightening an elongated cargo strap that is secured on its opposite ends to hold cargo in place, the strap tightening device comprising:
 a frame including a base and a pair of raised shoulders that extend outwardly from the base, each said shoulder having an interior surface and an exterior surface;
 a drum rotatably mounted to the frame between said shoulders, the drum having a longitudinal axis of rotation and three longitudinally extending slots for receiving said strap, said slots being disposed between said shoulders and arranged to facilitate passing the strap into the drum through any first one of the slots and out of the drum through any second one of the slots; and
 locking means for selectively preventing the drum from rotating in at least one direction, the locking means including a pawl and a pair of rachet wheels carried by opposite ends of the drum adjacent the exterior surfaces of the opposite shoulders, wherein said pawl takes the form of a U-shaped member having two leg members pivotally coupled to the frame, each said pawl leg member cooperating with one of said rachet wheels to selectively prevent the drum from rotating in one direction;
 cranking means for rotating the drum about its longitudinal axis to wind the strap about the drum;
 whereby to utilize the device for tightening straps, the elongated strap is threaded into the drum through a first one of the slots, out of the drum through a second one of the slots, back into the drum through a third one of the slots to form a loop between said second and third slots, and back out of the drum through the first slot.

10. A strap tightening device as recited in claim 9 wherein said cranking means includes a shaft carried by the drum on the exterior side of one of said shoulder, the shaft including a box shaped opening for receiving a box wrench to facilitate rotating the drum and a borehole opening for receiving a bar to facilitate rotating the drum.

11. A method of securing cargo to a carrier using a free standing strap tightening device having a drum rotatably carried by a frame and locking means for selectively preventing the drum for rotating in at least one direction, the drum having a longitudinal axis of rotation and three longitudinally extending slots for receiving a strap, wherein the elongated strap is threaded into the drum through a first one of the slots, out of the drum through a second one of the slots, back into the drum through a third one of the slots to form a loop between the second and third slots, and back out of the drum through the first slot, there being two free strap ends as a result of said threading, the method comprising the steps of:
 attaching the first and second free strap ends to the carrier;
 pulling on said loop to take up slack within the first free strap end;
 rotating the drum into a first locked position wherein the first free strap end is firmly held in place by the drum and the second strap end may move freely through the drum;
 pulling on said loop to take up slack within the second free strap end;
 rotating the drum into a second locked position wherein both the first and second free strap end are firmly held in place by the drum.

12. A method as recited in claim 11 further comprising the step of rotating the drum beyond the second locked position to cinch the elongated strap about a load to firmly secure the load to said carrier.

* * * * *